(12) United States Patent
Chen et al.

(10) Patent No.: US 12,185,022 B2
(45) Date of Patent: Dec. 31, 2024

(54) METHOD, ELECTRONIC DEVICE, AND COMPUTER PROGRAM PRODUCT FOR VIDEO PROCESSING

(71) Applicant: Dell Products L.P., Round Rock, TX (US)

(72) Inventors: Qiang Chen, Shanghai (CN); Pedro Fernandez Orellana, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 315 days.

(21) Appl. No.: 17/857,739

(22) Filed: Jul. 5, 2022

(65) Prior Publication Data

US 2023/0403370 A1 Dec. 14, 2023

(30) Foreign Application Priority Data

Jun. 10, 2022 (CN) .......................... 202210657591.4

(51) Int. Cl.
*H04N 7/01* (2006.01)
*G06V 10/774* (2022.01)
*G06V 40/10* (2022.01)

(52) U.S. Cl.
CPC ......... *H04N 7/0117* (2013.01); *G06V 10/774* (2022.01); *G06V 40/10* (2022.01)

(58) Field of Classification Search
CPC ..... H04N 7/0117; G06V 10/774; G06V 40/10
See application file for complete search history.

(56) References Cited

U.S. PATENT DOCUMENTS

2019/0130530 A1 5/2019 Schroers et al.
2020/0162789 A1* 5/2020 Ma ................. H04N 21/440263

OTHER PUBLICATIONS

Wikipedia, "Google Stadia," https://en.wikipedia.org/wiki/Google_Stadia, Aug. 11, 2021, 15 pages.
Wikipedia, "Video Super Resolution," https://en.wikipedia.org/wiki/Video_Super_Resolution, Jun. 27, 2021, 18 pages.

(Continued)

*Primary Examiner* — Twyler L Haskins
*Assistant Examiner* — Angel L Garces-Rivera
(74) *Attorney, Agent, or Firm* — Ryan, Mason & Lewis, LLP

(57) ABSTRACT

Embodiments of the present disclosure relate to a method, an electronic device, and a computer program product for video processing. The method for video processing includes receiving a first video with a first resolution from a first terminal device, the first video including an image of a first user. The method further includes converting the first video into a second video with a second resolution based on a computing model associated with the first user, the second resolution being higher than the first resolution. The method further includes sending the second video to a second terminal device. In this manner, only low-resolution videos need to be acquired and uploaded, and high-resolution videos can be obtained through reconstruction by using a computing model customized for video services, thereby ensuring that less bandwidth is occupied and improving the quality of the reconstructed videos.

20 Claims, 6 Drawing Sheets

(56) References Cited

OTHER PUBLICATIONS

Amazon Web Services, "AI Video Super Resolution," https://www.amazonaws.cn/en/solutions/ai-super-resolution-on-aws/, Feb. 2020, 6 pages.
Wikipedia, "GeForce Now," https://en.wikipedia.org/wiki/GeForce_Now, Jun. 6, 2021, 5 pages.
Wikipedia, "Xbox Cloud Gaming," https://en.wikipedia.org/wiki/Xbox_Cloud_Gaming, Aug. 9, 2021, 7 pages.
C. Faulkner, "Microsoft's xCloud game streaming is now widely available on iOS and PC," https://www.theverge.com/2021/6/28/22554267/microsoft-xcloud-game-streaming-xbox-pass-ios-iphone-ipad-pc, Jun. 28, 2021, 4 pages.
Wikipedia, "Nvidia Shield TV," https://en.wikipedia.org/wiki/Nvidia_Shield_TV, Jun. 24, 2021, 3 pages.
U.S. Appl. No. 17/400,350 filed in the name of Qiang Chen et al. on Aug. 12, 2021, and entitled "Method, Electronic Device, and Computer Program Product for Video Processing.".
U.S. Appl. No. 17/400,382 filed in the name of Pedro Fernandez Orellana et al. on Aug. 12, 2021, and entitled "Method, Electronic Device, and Computer Program Product for Image Processing.".
U.S. Appl. No. 17/520,908 filed in the name of Qiang Chen et al. on Nov. 8, 2021, and entitled "Method, System, and Computer Program Product for Streaming.".
U.S. Appl. No. 17/572,203 filed in the name of Pedro Fernandez Orellana et al. on Jan. 10, 2022, and entitled "Method, Device, and Computer Program Product for Video Processing.".
U.S. Appl. No. 17/665,649 filed in the name of Pedro Fernandez Orellana et al. on Feb. 7, 2022, and entitled "Computer-Implemented Method, Device, and Computer Program Product.".
U.S. Appl. No. 17/672,369 filed in the name of Qiang Chen et al. on Feb. 15, 2022, and entitled "Method for Generating Metadata, Image Processing Method, Electronic Device, and Program Product.".

* cited by examiner

METHOD, ELECTRONIC DEVICE, AND COMPUTER PROGRAM PRODUCT FOR VIDEO PROCESSING

RELATED APPLICATION(S)

The present application claims priority to Chinese Patent Application No. 202210657591.4, filed Jun. 10, 2022, and entitled "Method, Electronic Device, and Computer Program Product for Video Processing," which is incorporated by reference herein in its entirety.

FIELD

Embodiments of the present disclosure relate to the field of video technologies, and more particularly, to a method, an electronic device, and a computer program product for video processing.

BACKGROUND

In recent years, telecommuting has become increasingly popular, which has driven the rapid growth of remote video conferencing services. This puts great pressure on existing backbone networks and video conferencing services, and user experience is affected consequently. For example, video freezing occurs frequently. Some video conferencing service providers reduce a data volume by reducing a video resolution, so as to reduce traffic pressure on a network. However, this approach deteriorates the quality of conference images and results in poor user experience.

SUMMARY

In a first aspect of the present disclosure, a method for video processing is provided. The method includes receiving a first video with a first resolution from a first terminal device, the first video including an image of a first user. The method further includes converting the first video into a second video with a second resolution based on a computing model associated with the first user, the second resolution being higher than the first resolution. The method further includes sending the second video to a second terminal device.

In a second aspect of the present disclosure, a method for video processing is provided. The method includes receiving a first video with a first resolution from a first terminal device, the first video including an image of a first user. The method further includes determining a computing device near a second terminal device in video communication with the first terminal device. The method further includes sending a computing model associated with the first user and the first video to the determined computing device, so that the computing device generates a second video with a second resolution from the first video based on the computing model, the second resolution being higher than the first resolution.

In a third aspect of the present disclosure, a system for video processing is provided. The system includes at least one computing device and at least one routing device. A first routing device in the at least one routing device is configured to receive a first video with a first resolution from a first terminal device, the first video including an image of a first user, and forward the first video to a first computing device in at least one computing device. The first computing device is configured to convert the first video into a second video with a second resolution based on a computing model associated with the first user, the second resolution being higher than the first resolution, and send the second video to a second terminal device.

In a fourth aspect of the present disclosure, an electronic device is provided. The electronic device includes a processor and a memory coupled to the processor. The memory has instructions stored therein which, when executed by the processor, cause the device to perform actions. The actions include: receiving a first video with a first resolution from a first terminal device, the first video including an image of a first user; converting the first video into a second video with a second resolution based on a computing model associated with the first user, the second resolution being higher than the first resolution; and sending the second video to a second terminal device.

In a fifth aspect of the present disclosure, an electronic device is provided. The electronic device includes a processor and a memory coupled to the processor. The memory has instructions stored therein which, when executed by the processor, cause the device to perform actions. The actions include: receiving a first video with a first resolution from a first terminal device, the first video including an image of a first user; determining a computing device near a second terminal device in video communication with the first terminal device; and sending a computing model associated with the first user and the first video to the determined computing device, so that the computing device generates a second video with a second resolution from the first video based on the computing model, the second resolution being higher than the first resolution.

In a sixth aspect of the present disclosure, a computer program product is provided. The computer program product is tangibly stored on a non-volatile computer-readable medium and includes machine-executable instructions that, when executed by a machine, cause the machine to perform the method according to the first aspect or the second aspect.

This Summary is provided to introduce the selection of concepts in a simplified form, which will be further described in the Detailed Description below. The Summary is neither intended to identify key features or main features of the present disclosure, nor intended to limit the scope of the present disclosure.

BRIEF DESCRIPTION OF THE DRAWINGS

By more detailed description of example embodiments of the present disclosure, provided herein with reference to the accompanying drawings, the above and other objectives, features, and advantages of the present disclosure will become more apparent, where identical reference numerals generally represent identical components in the example embodiments of the present disclosure. In the drawings.

DETAILED DESCRIPTION

Figure 1:
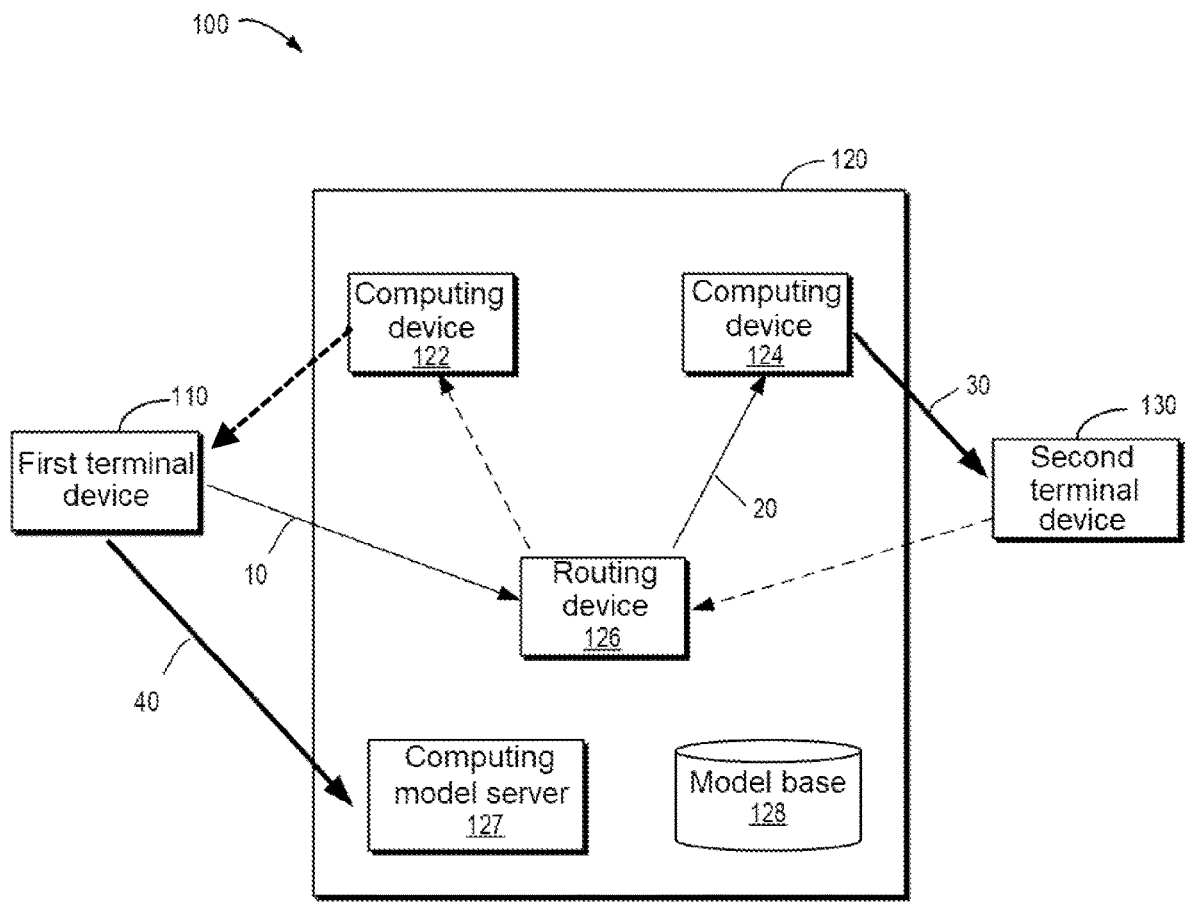
FIG. 1 is a schematic diagram of an example environment in which an embodiment of the present disclosure may be implemented.

Principles of the present disclosure will be described below with reference to several example embodiments illustrated in the accompanying drawings. Although the drawings show example embodiments of the present disclosure, it should be understood that these embodiments are merely described to enable those skilled in the art to better understand and further implement the present disclosure, and not to limit the scope of the present disclosure in any way.

As used herein, the term "include" and variations thereof mean open-ended inclusion, that is, "including but not limited to." Unless specifically stated, the term "or" means "and/or." The term "based on" means "based at least in part on." The terms "an example embodiment" and "an embodiment" indicate "at least one example embodiment." The term "another embodiment" indicates "at least one additional embodiment." The terms "first," "second," and the like may refer to different or identical objects. Other explicit and implicit definitions may also be included below.

It is to be noted that the figures or values used herein are illustrative and should not be construed as a limitation to the present disclosure.

Many factors affect the quality of video services. In broadband networks, network congestion is mainly caused by overloaded video services. Existing broadband networks typically provide users with a large downlink bandwidth but a relatively small uplink bandwidth. For example, a broadband service with a nominal bandwidth of 300 Mb/s generally means that the downlink bandwidth is 300 Mb/s, but actually the uplink bandwidth provided to users may be much smaller, for example, only 30 Mb/s. This can meet general video services, such as watching movies. However, a video conferencing service requires a larger upload bandwidth because it needs to upload and distribute participants' videos to other participants. It is difficult to meet this demand using the limited uplink bandwidth, which can lead to obvious video freezing and poor user experience. Some video conferencing service providers reduce data traffic by reducing resolutions of images captured by cameras to meet bandwidth requirements first. However, this solution results in unclear video images and poor user experience. In addition, existing video compression algorithms (e.g., H.264 and the like) are all general compression algorithms, but the redundancy of videos in video conferences is much higher than that of ordinary videos, so the general algorithms cannot provide an optimal compression effect to meet the requirement of video conferencing services.

In view of this, a solution for video processing is provided in embodiments of the present disclosure. In the solution, only low-resolution videos need to be acquired and uploaded, and high-resolution videos can be obtained through reconstruction by using a computing model customized for video services, thereby ensuring that less bandwidth is occupied and improving the quality of the reconstructed videos.

According to some embodiments of the present disclosure, a device of a video processing system receives a first video with a first resolution acquired from a first terminal device. The first video includes an image of a first user, for example, a user using the first terminal device to participate in a conference. The first resolution is low, so the first video only needs a relatively small amount of bandwidth to be uploaded to a network. Then, the first video is converted into a second video by using a computing model associated with the first user, the second video having a second resolution higher than the first resolution, and then the second video is sent to a second terminal device. Thus, participants using the second terminal device can see higher-quality videos of the first user participating in the conference.

The basic principles and some example embodiments of the present disclosure are illustrated below with reference to FIG. 1 to FIG. 6. It should be understood that these example embodiments are given only to enable those skilled in the art to better understand and thus implement the embodiments of the present disclosure, and are not intended to limit the scope of the present disclosure in any way.

FIG. 1 is a schematic diagram of example environment 100 in which an embodiment of the present disclosure may be implemented. As shown in FIG. 1, environment 100 includes first terminal device 110, video processing system 120, and second terminal device 130 connected via a network. First terminal device 110 and second terminal device 130 may be devices with an image acquisition apparatus, for example, mobile phones, tablet computers, desktop computers, laptop computers, game consoles, and the like. Video processing system 120 may be, for example, a cloud server, a data center, or the like, which may be arranged in a distributed or centralized manner.

Video processing system 120 may provide video transmission services, such as a video conference, for first terminal device 110 and second terminal device 130. For example, a user of first terminal device 110 (herein also referred to as "first user," not shown in the figure) and a user of second terminal device 130 (herein also referred to as "second user," not shown in the figure) may initiate a video conference by enabling a related application. By using a camera, a video acquired by first terminal device 110 and including a face image of the first user may be sent to video processing system 120, processed by video processing system 120, and then transmitted to second terminal device 130. Thus, the second user can see the first user. Similarly, the second user can be seen by the first user. It should be understood that environment 100 may include more terminal devices. In other words, video processing system 120 may provide, for example, video conferencing services for more terminal devices, and a video from one terminal device may be transmitted by video processing system 120 to two or more terminal devices.

Video processing system 120 includes routing device 126 and computing devices 122 and 124. Routing device 126 is configured to guide videos transmitted between terminal devices. Routing device 126 may be centralized or implemented as a group of routing devices distributed in various places. For the sake of simplicity, only one routing device 126 is shown in the figure. Computing devices 122 and 124 may be edge devices near the terminal devices, which provide video processing capabilities, such as reconstructing a low-resolution video into a high-resolution video and delivering the high-resolution video to a corresponding receiver. As an example rather than a limitation, computing device 122 is an edge device near first terminal device 110, and computing device 124 is an edge device near second terminal device 130.

As shown in the figure, a video acquired by first terminal device 110 may be sent 10 to routing device 126, and the video is addressed to second terminal device 130. Then, routing device 126 may determine computing device 124 associated with second terminal device 130, for example, determine that computing device 124 is an edge device near second terminal device 130, and forward 20 the video to computing device 124. In some embodiments, in order to reduce an upload bandwidth requirement from the first terminal device to routing device 126, the video acquired by first terminal device 110 may be a low-resolution video. For example, first terminal device 110 may have a maximum resolution capability in a range of 480 p to 1080 p (an exact maximum resolution depends on hardware performance of the device). However, first terminal device 110 can adjust an acquisition resolution to ¼ of its maximum resolution, thereby reducing the upload bandwidth requirement to ¹⁄₁₆ of the original. Computing device 124 may convert the received low-resolution video into a higher-resolution video and send 30 the video after conversion to second terminal device 130.

Similarly, second terminal device 130 may acquire a low-resolution video and upload the low-resolution video to video processing system 120, and video processing system 120 reconstructs the video to obtain a high-resolution video and delivers the high-resolution video to first terminal device 110.

Video processing system 120 may further include computing model server 127 and model base 128. Computing model server 127 is configured to generate (e.g., by training a neural network model) a computing model associated with a user. For example, in order to generate a computing model associated with the first user, first terminal device 110 sends 40 a high-resolution video to computing model server 127, so as to generate the computing model for the first user and store the computing model in model base 128 for later use. The computing model is customized for a user and therefore can efficiently reconstruct a high-resolution video from a low-resolution video including a corresponding user, as will be described in more detail below with reference to FIG. 4 and FIG. 5.

The computing model may be pre-distributed to computing device 122 or 124. For example, in a case where a video including an image of the first user is presented to a second user, computing device 124 near second terminal device 130 can be determined, and the computing model associated with the first user can be sent to computing device 124 in advance. Alternatively, the computing model associated with the first user may be sent 20 to computing device 124 together with the low-resolution video.

It should be understood that the structure and functions of environment 100 are described for illustrative purposes only and do not imply any limitation to the scope of the present disclosure. Embodiments of the present disclosure may also be applied to an environment different from environment 100. For example, the video processing system may include more or fewer computing devices. In some embodiments, for example, for a small-scale video processing system, the computing device and the routing device may be integrated in the same data center. In other words, video routing and reconstruction may be performed by the same device. In addition, individual units or devices in the video processing system may be omitted, and their functions may also be performed by other units or devices, and it is not limited to the manners described above. For example, the computing model may be generated or stored by either the routing device or the computing device.

Figure 2:
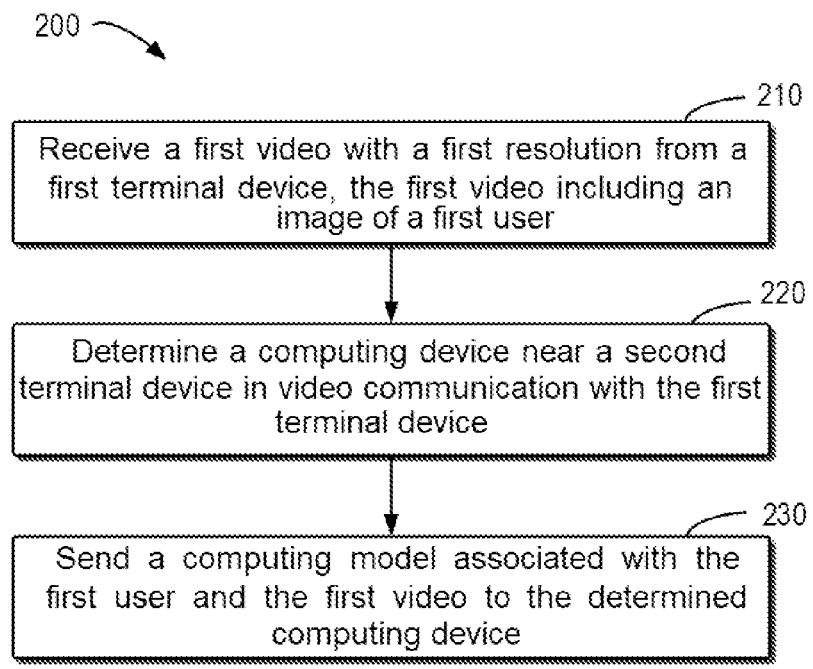
FIG. 2 is a flow chart of a method for video processing according to an embodiment of the present disclosure.

FIG. 2 is a flow chart of method 200 for video processing according to an embodiment of the present disclosure. Method 200 may be performed, for example, by routing device 126 as shown in FIG. 1. Alternatively, when routing device 126 is integrated with computing devices 122 and 124, the method may also be performed by an integrated device. It should be understood that method 200 may also include additional actions not shown and/or may omit actions shown, and the scope of the present disclosure is not limited in this regard. Method 200 will be described in detail below with reference to FIG. 1.

As described above, in order to reduce the upload bandwidth requirement and use from the terminal device to the network, first terminal device 110 may acquire an image (e.g., face) of a user, i.e., the first user, at a low resolution, generate a first video by coding, and send the first video to routing device 126.

At block 210, routing device 126 receives a first video with a first resolution from first terminal device 110, the first video including an image of a first user. The first video is addressed to second terminal device 130 that is or will be video-communicating with first terminal device 110. In some embodiments, the first video may carry an identifier of the first user.

At block 220, routing device 126 determines a computing device near the second terminal device in video communication with first terminal device 110. For example, a computing device near second terminal device 130 may be determined as computing device 124 according to IP address information of second terminal device 130.

At block 230, routing device 126 sends a computing model associated with the first user and the first video to determined computing device 124. In some embodiments, routing device 126 may retrieve the computing model associated with the first user from model base 128 according to the identifier of the first user carried in the first video or transmitted separately by first terminal device 110.

In response to receiving the first video with the first resolution and the computing model, computing device 124 generates a second video with a second resolution from the first video based on the computing model, where the second resolution is higher than the first resolution, as described below with reference to FIG. 3.

Figure 3:
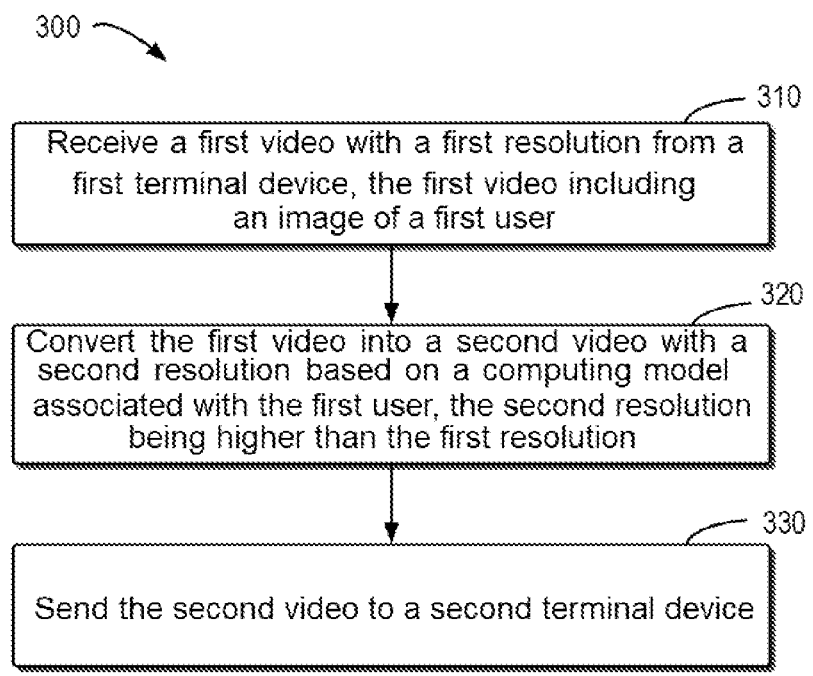
FIG. 3 is a flow chart of a method for video processing according to an embodiment of the present disclosure.

FIG. 3 is a flow chart of method 300 for video processing according to an embodiment of the present disclosure. Method 300 may be performed, for example, by computing device 124 as shown in FIG. 1. Alternatively, when routing device 126 is integrated with computing devices 122 and 124, the method may also be performed by an integrated device. It should be understood that method 300 may also include additional actions not shown and/or may omit actions shown, and the scope of the present disclosure is not limited in this regard. Method 300 will be described in detail below with reference to FIG. 1 and FIG. 2.

As described above, in order to reduce the upload bandwidth requirement and use from the terminal device to the network, first terminal device 110 acquires an image of the first user at a low resolution, and generates a first video by coding. Then, the first video is forwarded to computing device 124 via routing device 126.

At block 310, routing device 126 receives a first video with a first resolution from first terminal device 110, the first video including an image of a first user. In some embodiments, the first video may carry an identifier of the first user. Thus, computing device 124 may obtain a corresponding computing model from model base 128 according to the identifier of the first user.

In some embodiments, the computing model may be sent to computing device 124 together with the first video.

In some embodiments, computing device 124 may also pre-obtain a computing model associated with the first user. Computing device 124 may determine that participants of a video session on a second terminal device include the first user and then obtain a computing model associated with the first user.

At block 320, computing device 124 converts the first video into a second video with a second resolution based on the computing model associated with the first user, the second resolution being higher than the first resolution.

In some embodiments, the computing model is configured to generate a video with a third resolution. When a video with the first resolution is inputted to the computing model, the computing model outputs a video with the third resolution. Preferably, the third resolution is higher than the second resolution of the second video that will be presented on second terminal device 130, so as to ensure authenticity and accuracy of the second video obtained through reconstruction. Then, computing device 124 may convert a video with the third resolution into a second video with the second resolution by, for example, downsampling. In this manner, a bandwidth of downlink transmission can be controlled flexibly.

At block 330, computing device 124 sends the second video to the second terminal device. Therefore, in a case where first terminal device 110 uploads a video with a lower resolution and reduces bandwidth usage, second terminal device 130 at a peer end can also obtain a video with a higher resolution, thereby realizing high-quality video service with less resource utilization and improving user experience.

In order to effectively reconstruct to obtain a high-quality user video, a conventional solution is improved in an embodiment of the present disclosure. In the conventional solution, a trained model is generally used during reconstruction of a received video. The model needs to use a large amount of training data in a training phase, making the model more universal. Because the amount of training data is large, the training involves a complicated process and is difficult to converge. Moreover, the model trained in this way is usually very large, and during restoration of a video by using such a model, dedicated hardware (e.g., a high-performance graphics processing unit (GPU)) is required for reconstruction, which increases the cost of a given hardware configuration. In addition, since it is difficult for the above universal model to learn infinitely changing patterns from different training data, the quality of a video reconstructed according to the above model is not good. Critical information may be lost in image frames of the reconstructed video.

In video conferencing applications, users pay more attention to face features, video frames are quite similar to one another, and there is a large amount of redundant information. Therefore, a lightweight model suitable for this scenario is generated by using this characteristic according to an embodiment of the present disclosure.

Figure 4:
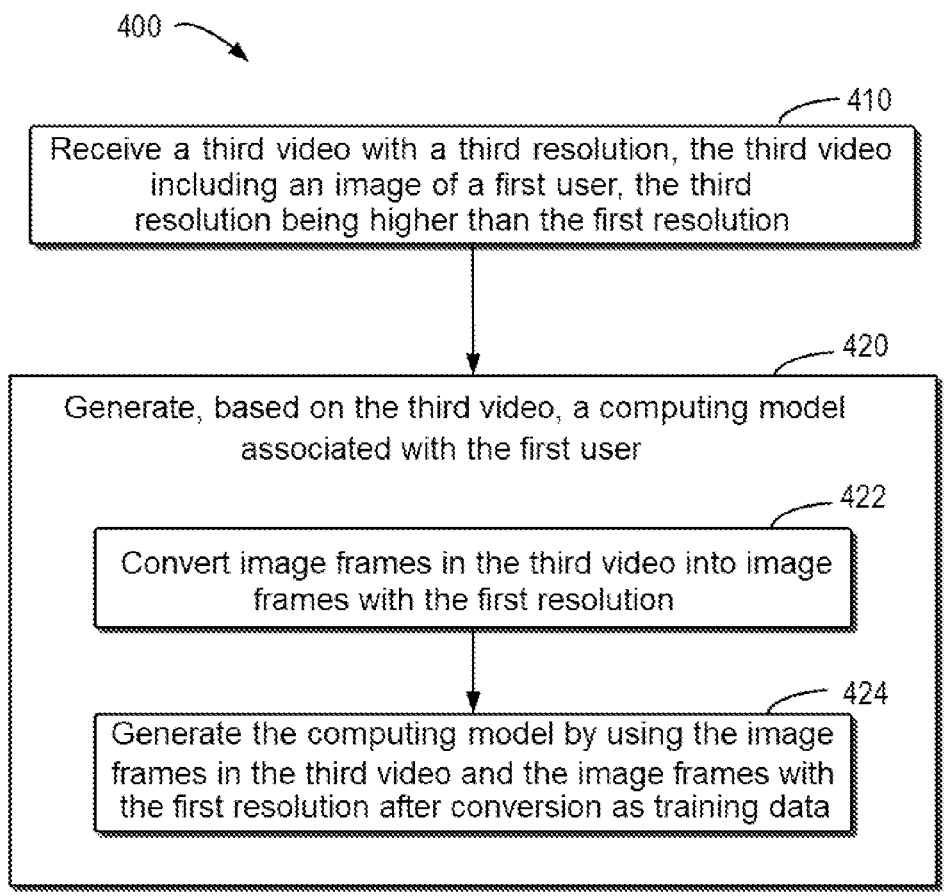
FIG. 4 is a flow chart of a method for generating a computing model according to an embodiment of the present disclosure.

An example process of generating a computing model associated with a user according to an embodiment of the present disclosure is described below with reference to FIG. 4 and FIG. 5. FIG. 4 is a flow chart of method 400 for generating a computing model according to an embodiment of the present disclosure. Method 400 may be performed by video processing system 120. Specifically, method 400 may be performed, for example, by computing model server 127 of video processing system 120. In some cases, computing model server 127 may be omitted, and in such an arrangement, method 400 may be performed by any of computing devices 122 and 124 and routing device 126 as shown in FIG. 1. It should be understood that method 400 may also include additional actions not shown and/or may omit actions shown, and the scope of the present disclosure is not limited in this regard.

In order to generate the computing model, the first user may upload some representative videos of himself/herself to video processing system 120 for pre-training. Such videos may be transmitted instantaneously during a video conference, or be additional video content captured and selected by the first user.

Accordingly, at block 410, video processing system 120 receives a third video with a third resolution from first terminal device 110. The third video includes an image (e.g., a face image) of the first user. The third resolution is higher than the resolution of a low-resolution video uploaded from a terminal device, for example, the first resolution, and is preferably higher than the second resolution, that is, a resolution of a reconstructed video that is to be presented on other terminal devices. In some embodiments, the third video may carry an identifier of the first user.

At block 420, the computing model associated with the first user is generated based on the third video.

Specifically, generating the computing model may include converting image frames in the third video into image frames with the first resolution at block 422. The first resolution is lower than the third resolution.

In some embodiments, a known algorithm, such as a downsampling algorithm common in a deep convolutional neural network, may be used to reduce the resolution. In some embodiments, the resolution may be reduced using a dedicated algorithm for a requested video. Depending on the algorithm, the effect of converting an image frame into a low-resolution image frame will be different, such as more or less lost information. By optimizing the algorithm (e.g., a downsampling algorithm in a deep convolutional neural network) to make it a dedicated algorithm for the requested video, the effect of reducing the resolution may be improved. For example, the image frame with resolution reduced retains more critical information. The dedicated algorithm for reducing resolution is not repeated here.

At block 424, a model (e.g., a neural network model) is trained by using the image frames of the third video and the image frames with the first resolution after conversion as training data, so as to generate a computing model for reconstructing a video. Such an embodiment will be described in detail below with reference to FIG. 5.

Figure 5:
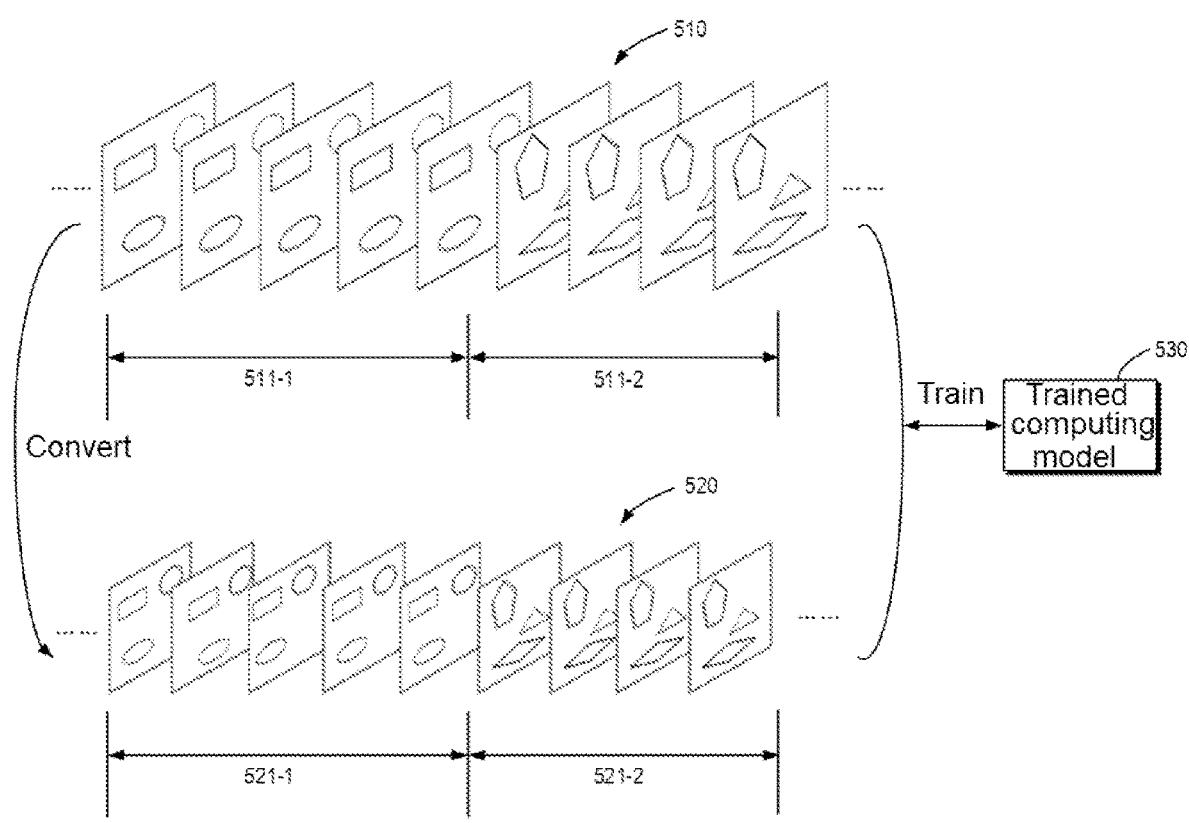
FIG. 5 is a schematic diagram of a training data set for training a model according to some embodiments of the present disclosure.

FIG. 5 is a schematic diagram of a training data set for training a model according to some embodiments of the present disclosure. As shown in the figure, first image frame subset 511-1 of image frames 510 of the third video and second image frame subset 521-1 of image frames 520 after conversion may be determined. Image frames in first image frame subset 511-1 and second image frame subset 521-1 have the same scenario. Here, the same scenario means that the image frames have identical or similar background. In some embodiments, whether a scenario change exists may be determined by comparing adjacent frames of a video.

It is also possible to determine first image frame subset 511-2 of first group of image frames 510 and second image frame subset 521-2 of second group of image frames 520. Image frames in first image frame subset 511-2 and second image frame subset 521-2 also have the same scenario, but their scenario is different from the scenario of the image frames in first image frame subset 511-1 and second image frame subset 521-1. Although only two image frame subsets of each of first group of image frames 510 and second group of image frames 520 are shown in FIG. 5, it is not limited thereto. In some embodiments, there may also be more or fewer image frame subsets. The training process results in a trained computing model 530.

In some embodiments, the training data set may be generated based on respective corresponding relationships between the image frames in the first image frame subset and the second image frame subset. For example, the computing model is generated by training a neural network model based on respective corresponding relationships between the image frames in first image frame subset 511-1 and second image frame subset 521-1 as shown in FIG. 5. In other words, data records in the training data set include downsampled low-resolution image frames and corresponding high-resolution image frames, and both include images of the same user and the same scenario or background. In this way, a large universal model may be trained without the need for large amounts of training data, thus reducing the computing cost. Moreover, because the number of model parameters is small, a small amount of bandwidth is occupied during model transmission. On the other hand, a model trained in this way can more accurately reconstruct details of a particular user's face, so as to achieve a satisfactory image quality even from a low-resolution original video.

The foregoing describes example embodiments of the present disclosure with reference to FIG. 1 to FIG. 5. Compared with the conventional solution, many advantages can be realized in embodiments of the present disclosure. For example, in a remote video conferencing service, an upload bandwidth requirement is reduced through low-resolution videos, and a dedicated lightweight computing model is used to enhance the video quality, thereby improving user experience. In some implementations, embodiments of the present disclosure can be combined with existing video applications as plug-ins and implemented in a way that is imperceptible to users. An original video is directly used in the case of a good network condition, and low-resolution videos are acquired and reconstructed to obtain high-quality videos in the case of a poor network condition, thereby realizing good flexibility.

Figure 6:
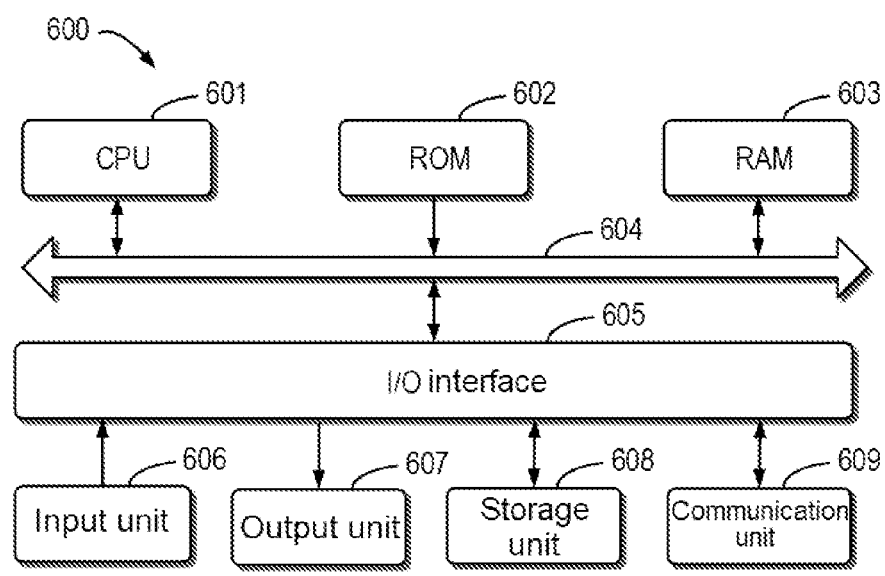
FIG. 6 is a block diagram of an example device that may be configured to implement an embodiment of the present disclosure.

FIG. 6 is a schematic block diagram of example device 600 that can be used to implement embodiments of the present disclosure. For example, computing devices 122 and 124 and routing device 126 as shown in FIG. 1 may be implemented by device 600 respectively. As shown in FIG. 6, device 600 includes central processing unit (CPU) 601 that may perform various appropriate actions and processing according to computer program instructions stored in read-only memory (ROM) 602 or computer program instructions loaded from storage unit 608 to random access memory (RAM) 603. Various programs and data required for the operation of device 900 may also be stored in RAM 603. CPU 601, ROM 602, and RAM 603 are connected to each other through bus 604. Input/output (I/O) interface 605 is also connected to bus 604.

A plurality of components in device 600 are connected to I/O interface 605, including: input unit 606, such as a keyboard and a mouse; output unit 607, such as various types of displays and speakers; storage unit 608, such as a magnetic disk and an optical disc; and communication unit 609, such as a network card, a modem, and a wireless communication transceiver. Communication unit 609 allows device 600 to exchange information/data with other devices via a computer network, such as the Internet, and/or various telecommunication networks.

The various processes and processing described above, such as method 200 or method 300 or method 400, may be performed by CPU 601. For example, in some embodiments, method 200, method 300, and/or method 400 may be implemented as a computer software program that is tangibly included in a machine-readable medium such as storage unit 608. In some embodiments, part of or all the computer program may be loaded and/or installed onto device 600 via ROM 602 and/or communication unit 609. One or more actions of method 200, method 300, and/or method 400 described above may be performed when the computer program is loaded into RAM 603 and executed by CPU 601.

Embodiments of the present disclosure include a method, an apparatus, a system, and/or a computer program product. The computer program product may include a computer-readable storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in the computing/processing device.

The computer program instructions for performing the operations of the present disclosure may be assembly instructions, instruction set architecture (ISA) instructions, machine instructions, machine-related instructions, microcode, firmware instructions, state setting data, or source code or object code written in any combination of one or more programming languages, wherein the programming languages include object-oriented programming languages such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer may be connected to a user computer through any kind of networks, including a local area network (LAN) or a wide area network (WAN), or may be connected to an external computer (e.g., connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions to implement various aspects of the present disclosure.

Various aspects of the present disclosure are described herein with reference to flow charts and/or block diagrams of the method, the apparatus (system), and the computer program product according to embodiments of the present disclosure. It should be understood that each block of the flow charts and/or the block diagrams and combinations of blocks in the flow charts and/or the block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in a reverse order, which depends on involved functions. It should be further noted that each block in the block diagrams and/or flow charts as well as a combination of blocks in the block diagrams and/or flow charts may be implemented by using a special hardware-based system that executes specified functions or actions, or implemented by using a combination of special hardware and computer instructions.

Various embodiments of the present disclosure have been described above. The above description is illustrative, rather than exhaustive, and is not limited to the disclosed various embodiments. Numerous modifications and alterations will be apparent to persons of ordinary skill in the art without departing from the scope and spirit of the illustrated embodiments. The selection of terms used herein is intended to best explain the principles and practical applications of the various embodiments or the improvements to technologies on the market, so as to enable persons of ordinary skill in the art to understand the embodiments disclosed herein.

What is claimed is:

1. A method for video processing, comprising:
   receiving a first video with a first resolution from a first terminal device, the first video comprising an image of a first user and no other users;
   converting the first video into a second video with a second resolution based on a computing model associated with the first user, the second resolution being higher than the first resolution; and
   sending the second video to a second terminal device;
   wherein the computing model associated with the first user comprises a first user-specific computing model customized for the first user through training that utilizes a first set of one or more additional videos each comprising one or more additional images of the first user and no other users; and
   wherein the one or more additional videos collectively comprise at least a portion of a first user-specific training data set for training the first user-specific computing model, the first user-specific training data set comprising a plurality of data records each including one or more image frames at the first resolution and one or more respective corresponding image frames at the second resolution, each such image frame including an image of the same first user in a same scenario or background.

2. The method according to claim 1, further comprising:
   determining that participants of a video session on the second terminal device comprise the first user; and
   obtaining the computing model associated with the first user.

3. The method according to claim 1, wherein converting the first video into a second video with a second resolution comprises:
   providing the first video to the computing model as an input to generate a video with a third resolution, the third resolution being higher than the second resolution; and
   converting the video with the third resolution into the second video with the second resolution.

4. The method according to claim 1, further comprising:
   receiving a third video with a third resolution, the third video comprising the image of the first user, the third resolution being higher than the first resolution; and
   generating, based on the third video, the computing model associated with the first user, the computing model being configured to convert a video comprising the image of the first user and having the first resolution into a video with the third resolution.

5. The method according to claim 4, wherein generating the computing model associated with the first user comprises:

converting image frames in the third video into image frames with the first resolution; and
generating the computing model by using the image frames in the third video and the image frames with the first resolution after conversion as training data.

6. An electronic device, comprising:
a processor; and
a memory coupled to the processor, wherein the memory has instructions stored therein which, when executed by the processor, cause the device to execute the method of claim 1.

7. A computer program product that is tangibly stored on a non-transitory computer-readable medium and comprises machine-executable instructions, wherein the machine-executable instructions, when executed by a machine, cause the machine to perform the method according to claim 1.

8. The method according to claim 1, wherein the first user is one of a plurality of participants in a video conference involving at least the first user and a second user associated with the second terminal device.

9. The method according to claim 8, wherein the second user has an associated computing model comprising a second user-specific computing model customized for the second user through training that utilizes a second set of one or more additional videos each comprising one or more additional images of the second user.

10. A method for video processing, comprising:
receiving a first video with a first resolution from a first terminal device, the first video comprising an image of a first user and no other users;
determining a computing device near a second terminal device in video communication with the first terminal device; and
sending a computing model associated with the first user and the first video to the determined computing device, so that the computing device generates a second video with a second resolution from the first video based on the computing model, the second resolution being higher than the first resolution;
wherein the computing model associated with the first user comprises a first user-specific computing model customized for the first user through training that utilizes a first set of one or more additional videos each comprising one or more additional images of the first user and no other users; and
wherein the one or more additional videos collectively comprise at least a portion of a first user-specific training data set for training the first user-specific computing model, the first user-specific training data set comprising a plurality of data records each including one or more image frames at the first resolution and one or more respective corresponding image frames at the second resolution, each such image frame including an image of the same first user in a same scenario or background.

11. The method according to claim 10, further comprising:
receiving a third video with a third resolution, the third video comprising the image of the first user, and the third resolution being higher than the first resolution; and
generating, based on the third video, the computing model associated with the first user, the computing model being configured to convert a video comprising the image of the first user and having the first resolution into a video with the third resolution.

12. The method according to claim 11, wherein generating the computing model associated with the first user comprises:
converting image frames in the third video into image frames with the first resolution; and
generating the computing model by using the image frames in the third video and the image frames with the first resolution after conversion as training data.

13. An electronic device, comprising:
a processor; and
a memory coupled to the processor, wherein the memory has instructions stored therein which, when executed by the processor, cause the device to execute the method of claim 10.

14. A computer program product that is tangibly stored on a non-transitory computer-readable medium and comprises machine-executable instructions, wherein the machine-executable instructions, when executed by a machine, cause the machine to perform the method according to claim 10.

15. The method according to claim 10, wherein the first user is one of a plurality of participants in a video conference involving at least the first user and a second user associated with the second terminal device.

16. The method according to claim 15, wherein the second user has an associated computing model comprising a second user-specific computing model customized for the second user through training that utilizes a second set of one or more additional videos each comprising one or more additional images of the second user.

17. A system for video processing, comprising:
at least one computing device; and
at least one routing device;
wherein a first routing device in the at least one routing device is configured to:
receive a first video with a first resolution from a first terminal device, the first video comprising an image of a first user and no other users; and
forward the first video to a first computing device in the at least one computing device,
wherein the first computing device is configured to:
convert the first video into a second video with a second resolution based on a computing model associated with the first user, the second resolution being higher than the first resolution; and
send the second video to a second terminal device;
wherein the computing model associated with the first user comprises a first user-specific computing model customized for the first user through training that utilizes a first set of one or more additional videos each comprising one or more additional images of the first user and no other users; and
wherein the one or more additional videos collectively comprise at least a portion of a first user-specific training data set for training the first user-specific computing model, the first user-specific training data set comprising a plurality of data records each including one or more image frames at the first resolution and one or more respective corresponding image frames at the second resolution, each such image frame including an image of the same first user in a same scenario or background.

18. The system according to claim 17, further comprising a computing model server configured to:
receive a third video with a third resolution, the third video comprising the image of the first user, and the third resolution being higher than the first resolution; and generate, based on the third video, the computing model associated with the first user, the computing model being configured to convert a video comprising the image of the first user and having the first resolution into a video with the third resolution.

19. The system according to claim 18, wherein the computing model server is further configured to:
  convert image frames in the third video into image frames with the first resolution; and
  generate the computing model by using the image frames in the third video and the image frames with the first resolution after conversion as training data.

20. The system according to claim 17, wherein the system provides a video conferencing service for the first terminal device and the second terminal device.

* * * * *